Nov. 7, 1950 M. R. HULL 2,528,750
ABDOMINAL MUSCLE EXERCISER
Filed Nov. 5, 1948
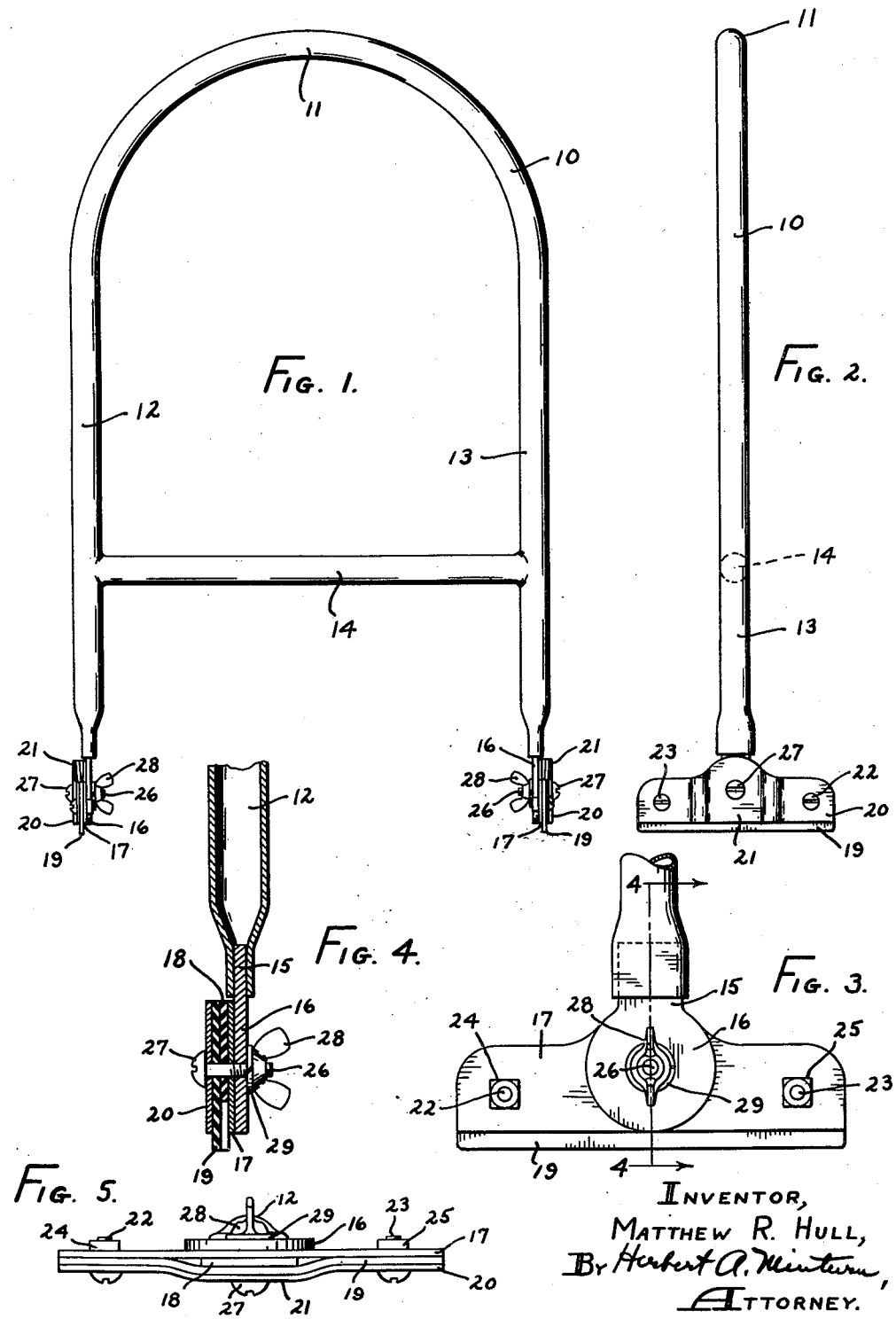
INVENTOR,
MATTHEW R. HULL,
By Herbert A. Minturn,
ATTORNEY.

UNITED STATES PATENT OFFICE 2,528,750

ABDOMINAL MUSCLE EXERCISER

Matthew R. Hull, Connersville, Ind.

Application November 5, 1948, Serial No. 58,507

1 Claim. (Cl. 272—79)

This invention relates to a structure having for its purpose the rocking back and forth of a member thereof against a resistance in order to stimulate and increase the muscular tone of the muscles particularly in the abdominal region. A further purpose of the invention is to provide a structure for that use which will be self supporting when not in use; which will be exceedingly simple from the point of manufacturing; and which will also be exceedingly simple in its use wherein no electric motors or rotary parts of the nature of pedals and the like are required.

The invention is shown herein in one particular form as illustrated in the accompanying drawing in which, Fig. 1 is a view in front elevation of a structure embodying the invention;

Fig. 2, a view in side elevation;

Fig. 3, a detail of a base side of the structure on an enlarged scale;

Fig. 4, a vertical section on the line 4—4 in Fig. 3; and

Fig. 5, a view in bottom plan elevation.

Like characters of reference indicate like parts throughout the several views in the drawing.

Referring to the drawing, a member generally designated by the numeral 10 is formed to be inverted U-shaped to have the upper portion 11 of this member formed in the shape of an arc of a circle to join integrally with the side legs 12 and 13. Then down toward the lower end portions of these side legs 12 and 13, there is an interconnecting foot bar 14 having its ends united with the vertical legs 12 and 13.

Each of the lower ends of these legs 12 and 13, the member 10 being preferably formed out of tubular material, is deformed so as to receive slidingly therein from the lower end a tongue 15 of a circular disc-like foot 16.

A base plate 17 is brought up against the outside face of the foot 16. This member 17 is a planar member. Then against the outside face of this base member 17 there is placed a resilient washer 18, and in turn against that washer there is placed the central portion of an elastic band or length of resilient material 19 coextensive in length with the member 17.

Finally there is placed against the outside of the material 19 a bowed retaining and spring plate 20. This plate 20 is normally provided with the central portion 21 outwardly bowed away from the plate 17 so that the material 19 is carried around over the central washer 18 and into contact with the inner face of the end portions of the plate 17.

The plate 20 is secured to the plate 17 by means of bolts 22 and 23 passing through the plate 18, the material 19, and the plate or base member 17 to be secured in position by the nuts 24 and 25 respectively. Then there is carried a bolt 26 centrally through the foot member 16 and through the plate or base member 17, the washer 18, the material 19, and the outside plate 20. This bolt 26 is provided with a head 27 on the one end, herein shown as in abutment with the plate 20, and is provided with an adjusting nut 28 on the other end, herein shown as a wing nut whereby turning of the wing nut 28 will tend to increase the frictional resistance between the foot 16 and the base member 17, or to reduce that frictional resistance by loosening the nut 28 on the bolt 26. Preferably there is provided a lock washer 29 between the nut 28 and the foot 16.

Thus it is to be seen that by proper turning of the nut 28, the desired degree of resistance is secured in regard to the rocking of the member 10 in respect to the base member 17. These members 17 together with the material 19 which is preferably extended below both the plates 17 and 20 to form a friction member across the underside of the two plates for contact with the floor of sufficient longitudinal length to cause the plate to remain in contact with the floor through the lower edge of the material 19 while the member 10 is rocked in respect thereto. The washer 18 and the material 19 are both compressable, being not only of a frictional material but also resilient in nature, and normally the compression is had of those two members by pulling the bow 21 of the plate 20 in toward the general plane of the ends of the member 20 by means of tightening the nut 28.

The structure is preferably used by the operator sitting upon a stool and placing his feet upon the foot bar 14 with the material 19, by its lower edge, resting upon the floor, and the operator grasping the arched cross member 11 by his hand. Then by rocking his body forwardly and rearwardly to cause a corresponding rocking of the member 10, the member rocks in respect to the base construction just described, and the resistance to that rocking is set up to the desired degree by manipulating the two nuts 28. This resistance may be made as much or as little as may be desired as above indicated. In this rocking to and fro of the operator, he necessarily has to use or bring into play not only muscles of his back, but also those abdominal muscles which are rarely used otherwise, particularly by aged persons. This exercising of these muscles increases the muscle tone, and thereby promotes the normal functioning of the muscular system.

While I have herein shown and described my invention in the one particular form, it is to be understood that the structure may be embodied in different forms without departing from the spirit of the invention, and I therefore do not desire to be limited to that precise form beyond the limitations which may be imposed by the following claim.

I claim:

An exerciser comprising an inverted U-shaped member having a pair of spaced apart side legs interconnected by an upper cross member; a horizontally disposed foot member interconnecting said legs near their lower end portions but spaced above their ends; separate base members respectively carrying said legs; each of said base members comprising a pair of vertical plates; resilient friction material interposed between said plates and extending below both of said plates to provide a floor engaging surface; one of said plates being outwardly bowed with respect to the other plate in the nature of a leaf spring; a bolt interengaging respectively the lower end portion of said legs, said pair of plates, and the resilient material therebetween to urge said leg lower end portion into frictional engagement with one of said plates, said bolt interengaging said bowed plate through the bowed portion thereof; and a nut screw-threadedly engaged on said bolt for varying pressure of said engagement.

MATTHEW R. HULL.

REFERENCES CITED

The following references are of record in the file of this patent:

UNITED STATES PATENTS

| Number | Name | Date |
|---|---|---|
| 1,535,391 | Anderson | Apr. 28, 1925 |
| 2,223,309 | Swanson | Nov. 26, 1940 |

FOREIGN PATENTS

| Number | Country | Date |
|---|---|---|
| 12,116 | Great Britain | 1890 |